United States Patent
Guthery

(10) Patent No.: US 8,631,165 B2
(45) Date of Patent: *Jan. 14, 2014

(54) COMMUNICATIONS NETWORK WITH SMART CARD

(75) Inventor: Scott B. Guthery, Newton, MA (US)

(73) Assignee: Momin Development Fund LLC, Wilmington, DE (US)

(*) Notice: Subject to any disclaimer, the term of this patent is extended or adjusted under 35 U.S.C. 154(b) by 54 days.

This patent is subject to a terminal disclaimer.

(21) Appl. No.: 13/362,173

(22) Filed: Jan. 31, 2012

(65) Prior Publication Data

US 2012/0163401 A1    Jun. 28, 2012

Related U.S. Application Data

(63) Continuation of application No. 12/507,036, filed on Jul. 21, 2009, now Pat. No. 8,316,157, which is a continuation of application No. 10/470,128, filed as application No. PCT/US02/09147 on Mar. 25, 2002, now Pat. No. 7,571,257.

(60) Provisional application No. 60/308,924, filed on Jul. 31, 2001.

(51) Int. Cl.
*G06F 15/16* (2006.01)

(52) U.S. Cl.
USPC .................................................. 709/250

(58) Field of Classification Search
USPC ............................................ 709/250, 246
See application file for complete search history.

(56) References Cited

U.S. PATENT DOCUMENTS

| | | | |
|---|---|---|---|
| 5,633,484 | A | 5/1997 | Zancho et al. |
| 6,084,968 | A | 7/2000 | Kennedy et al. |
| 6,112,305 | A | 8/2000 | Dancs et al. |
| 6,154,544 | A | 11/2000 | Farris et al. |
| 6,192,436 | B1 | 2/2001 | Jacobson et al. |
| 6,223,289 | B1 | 4/2001 | Wall et al. |
| 6,226,680 | B1 | 5/2001 | Boucher et al. |
| 6,240,513 | B1 | 5/2001 | Friedman et al. |

(Continued)

FOREIGN PATENT DOCUMENTS

| | | |
|---|---|---|
| WO | WO-97/43847 | 11/1997 |
| WO | WO-01/24475 | 4/2001 |

(Continued)

OTHER PUBLICATIONS

Final Office Action on U.S. Appl. No. 12/507036, mailed Jul. 11, 2011.

(Continued)

*Primary Examiner* — Larry Donaghue

(57) ABSTRACT

Methods and systems are disclosed to enable a smart card having relatively low data rate and low computational power to control a high data rate communications channel without degradation of performance. The smart card and an associated monitor/interface, which can be implemented in a network access device, are interposed between transmitting and receiving nodes in a network, and configured to intervene when conditions of rules stored in the smart card are met. For example, the smart card can intervene when a packet header indicates sufficient change in information, such as the exceeding of a predefined threshold or a requirement for user authorization/authentication. In one mode of regulating packet flow, the smart card selectively enables or disables packet transmission, reception, or both, according to the rules stored therein.

20 Claims, 3 Drawing Sheets

(56) References Cited

U.S. PATENT DOCUMENTS

| | | | |
|---|---|---|---|
| 6,247,060 B1 | 6/2001 | Boucher et al. | |
| 6,247,644 B1 | 6/2001 | Horne et al. | |
| 6,260,111 B1 | 7/2001 | Craig et al. | |
| 6,369,855 B1 | 4/2002 | Chauvel et al. | |
| 7,571,257 B2 | 8/2009 | Guthery | |
| 8,316,157 B2 * | 11/2012 | Guthery | 709/250 |
| 2003/0041244 A1 | 2/2003 | Buttyan et al. | |
| 2003/0177382 A1 | 9/2003 | Ofek et al. | |

FOREIGN PATENT DOCUMENTS

| | | |
|---|---|---|
| WO | WO-01/31880 | 5/2001 |
| WO | WO-01/95074 | 12/2001 |
| WO | WO-01/99449 | 12/2001 |
| WO | WO-03/012671 | 2/2003 |

OTHER PUBLICATIONS

International Preliminary Examination Report for PCT/US02/09147, completed Jul. 9, 2003.

International Search Report for PCT/US02/09147, mailed Jun. 13, 2002.

M Degermark, M. Engan, B. Nordgren, and S. Pink, "Low-Loss TCP/IP Header Compression for Wireless Networks," Nov. 1996, pp. 375-387.

M. Blaze, "High-Bandwidth Encryption with Low-Bandwidth Smartcards," AT & T Bell Laboratories, vol. 1039, Dec. 3, 1995, pp. 33-40.

Non-Final Office Action on U.S. Appl. No. 12/507,036, mailed Mar. 29, 2011.

Notice of Allowance on U.S. Appl. No. 12/507,036, mailed Oct. 4, 2011.

* cited by examiner

COMMUNICATIONS NETWORK WITH SMART CARD

CROSS-REFERENCE TO RELATED PATENT APPLICATIONS

This application is a Continuation of U.S. patent application Ser. No. 12/507,036, filed Jul. 21, 2009, which is a continuation of U.S. patent application Ser. No. 10/470,128, filed May 12, 2004 (now U.S. Pat. No. 7,571,257), which is a U.S. National Stage Entry of International Application No. PCT/US02/09147, filed Mar. 25, 2002, which claims the benefit of U.S. Provisional Patent Application No. 60/308,924, filed Jul. 31, 2001, all of which are herein incorporated by reference.

BACKGROUND

1. Field

The present disclosure relates in general to communication systems and methods for controlling access thereto. More particularly, the present invention relates to systems and methods for controlling remote access to wireless communication networks (or other environments) to ensure that remote users and their identifiable circumstances are appropriate for network access.

2. Background

Wireless communication networks allow users to perform a variety of operations with a degree of mobility not afforded by traditional wired communication networks. In addition to allowing mobile users to conduct telephone calls and other communications with cellular telephones and various personal communication devices, wireless networks are also being used to exchange information in high-order human recognizable form, and in forms recognizable by computers and computerized devices.

As improved wireless communication infrastructures continue to proliferate, along with newer high-speed wireless communication protocols such as the "Wi-Fi" IEEE Standard 802.11 (which allows high-speed data transfer in public wireless networks), data transmission using wireless communication networks will continue to expand significantly.

Controlling access to wireless communication networks is a concern of network managers, as well as customers who wish to allow control access to restricted or confidential information. The general approach to authenticating users who seek access to secure information is to have them demonstrate knowledge of a secret that only authorized users are expected to know. The typical method of demonstrating knowledge of the secret is to have an aspiring user enter a string of alphanumeric characters (a security code) in the form of passwords, digital combinations, personal identification numbers (PINs), cryptographic keys, and the like.

When the latter approach is used, large central databases must sometimes be maintained to keep track of the access control information for all authorized users who may attempt to access the system. Users may object to the loss of privacy in surrendering personal information, and may also be wary that their access code or other access information can be illegally obtained by "hackers," or even improperly revealed by the network operator to third parties. Network managers may also be wary of this approach for similar reasons, along with possible legal exposure if adequate security precautions are later deemed to have been absent when personal information is improperly obtained by third parties. Further, maintaining central user access databases can be expensive and time-consuming for both the network administrator and large organization subscribers needing to provide access to a large number of users, since the identify of the users and even their access information can frequently change.

One alternative approach is to require users to use integrated circuit cards ("smart cards") to access restricted information. Now well known in the electronic arts, smart cards are devices similar to credit cards in appearance and size, but which have embedded integrated circuits. The integrated circuits can vary in complexity from a few non-volatile memory locations to a complete computer system. The smart card can be connected to the communication network via a smart card interface, the functions of which are known in the art. The smart card can store the proper authorization code in memory, requiring the user to do nothing more than properly insert it into the smart card interface. More sophisticated systems can require the user to input an authorization code that must match the stored code before access to restricted systems or information will be granted. The smart card can also serve as the intermediary between the network access device and the mobile receiver, passing along only the information that the user of the smart card is authorized to use, and rejecting other information.

The prior art includes a number of patents and other references using smart cards to control access to communication networks. These include the following, each of which is incorporated by reference herein:

M. Blaze, "High-Bandwidth Encryption with Low-Bandwidth Smartcards." Jan. 18, 1996. Cambridge Workshop on Fast Software Encryption, February 1996;

Nokia, PCMCIA WiFi (802.11b) Card with SIM Card Reader: C110/C111;

U.S. Pat. No. 6,247,060: Passing a Communication Control Block from Host to a Local Device such that a Message is Processed on the Device;

U.S. Pat. No. 6,240,513: Network Security Device;

U.S. Pat. No. 6,226,680: Intelligent Network Interface System Method for Protocol Processing;

U.S. Pat. No. 6,154,544: Rolling Code Security System;

WO131880A1: Safe Terminal Provided with a Smart Card Reader Designed to Communicate with a Server via an Internet-Type Network;

WO124475A2: Method and Architecture for Remote Monitoring of a User Station via an Internet-Type Network and Application Thereof to a Smart Card Demonstrator;

WO0195074A2: A Method and System for Securely Displaying and Confirming Request to Perform Operation on a Host;

WO0199449A1: Filtering Data Units In A Terminal Identity Card With Additional Smart Card Reader;

Robust Header Compression (rohc) Work Group (http://www.ietf.org/html.charters/rohc-charter.html) of the Internet Engineering Task Force (IETF); and "Low-Loss TCP/IP Header Compression for Wireless Networks." Mikael Degermark, Mathias Engan, Bjorn Nordgren, and Stephan Pink. In ACM MobiCom, November 1996.

A growing number of entities now provide tamper-resistant smart cards to specific and identified groups of people. Examples include the American Express Blue Card, the Smart Visa Card and corporate employee identification cards. After proper activation, these cards authenticate the cardholder for digital network servers and provide authorization credentials for the use of these resources to these servers. The entities providing these cards may charge a fee for these authentication and authorization services, as is the case with the American Express Blue Card. Alternatively, the smart card may be provided as an integral part of a broader contractual relationship, such as that between an employer and an employee or between a service and a subscriber.

There are many benefits to using smart cards to control access to wireless communication networks. However, one serious drawback is that the current and foreseeable generation of smart cards do not have sufficient throughput to handle high-speed data transfers. That is, the prior art approach of directly interposing a smart card between the network access device (a transmitter) and the mobile receiver requires that the information not be transmitted at a rate higher than the maximum rate capable of being handled by the smart card.

What is therefore desirable, but previously non-existent, is a wireless communication network that can provide high-speed data transfer, even while relying upon a relatively slower smart card, without reduction of high-speed performance.

SUMMARY

The present invention meets these requirements by providing communications methods and systems that enable a low data rate, low computational power device (such as a smart card) to control a high data rate, high computational power channel, without a reduction in high-speed performance or packet throughput. As described in detail below, the invention utilizes an information packet monitor that runs on a wireless access device and "watches" information packets as they are encountered, applying rules provided to it by the smart card. When protocol state changes are indicated—such as the passage of a decompressed header—the monitor consults the smart card and gets the rules it is using updated.

In particular, one embodiment of a communications network according to the invention includes an information packet transmitter, an information packet receiver, a smart card, a smart card interface coupled to the information packet transmitter or to the information packet receiver (the smart card interface adapted to electrically engage with the smart card), and an information packet monitor coupled to the smart card interface, the information packet monitor adapted to monitor for predefined changes in the information packets and control the flow of those packets according to rules in the smart card. The smart card is normally in an inactive state, but is activated by the information packet monitor to regulate the communication of information packets when the predefined changes meet the conditions of contingency rules stored in the smart card. In one example mode, the smart card, upon activation, provides rules and modifications for packet data, headers, or both. The rules and modifications can implement communication policies of the entity providing communication services to the user of the services, and can be stored in the smart card to prevent alteration or tampering.

The present invention also provides, in a communication network, a method of communicating information packets. In one practice of the invention, the method includes the steps of transmitting information packets, receiving information packets, and via an information packet monitor and a smart card normally in an inactive state, monitoring for changes in the information packets. The method also includes the step of, via the information packet monitor and a smart card, regulating the communication of information packets when the changes in the information packets meet the predefined conditions of contingency rules stored in the smart card.

BRIEF DESCRIPTION OF THE DRAWING FIGURES

Features and advantages of the present invention will become apparent to those skilled in the art from the description below, with reference to the following drawing figures, in which.

DETAILED DESCRIPTION

The present invention is adapted to transfer information in the form of information packets between a network access device and a mobile device. The information packets include a header portion and a data portion, as will next be discussed.

Functional Basis: Typical communications protocols are characterized by placing headers on a data packet that is to be transmitted. The headers describe various properties of data and the method by which is it to be transmitted. When the information packet reaches the destination described in the header, the header is removed and the packet provided to the recipient. When the information that is to be transmitted spans many data packets, much of the information contained in the header is either constant or changes in a predictable fashion.

To improve network efficiency, header compression techniques are used. With header compression, only the information that has changed in an unpredictable way is included in the header. If all the header information for a particular data packet is constant or predictable, then the information packet can be sent with no header at all, or with a very minimal header.

Packet Monitor: As discussed in detail below, in one embodiment of the present invention, an information packet monitor monitors the information packet transmissions and regulates the flow of information packets according to rules provided by a smart card. The rules can be as simple as allowing packets from certain addresses to pass, and blocking packets from other addresses. Other more complex rules may call for the packets to be altered before they are passed on. Of particular note for the purpose of this invention are rules that concern changes in the nature of the packet flow such as would be indicated by the appearance of uncompressed packet headers. The appearance of an uncompressed header means that the constant values of previous compressed headers are changing to new constant values, and this indicates a change in the nature of the packet flow. When these special rules are triggered, the information packet monitor activates the smart card, provides the smart card with the new constant values, and may receive new monitoring rules from the smart card. In this way, the smart card controls the flow of packets on the high-speed network, via a low-speed connection to the network.

Figure 1:
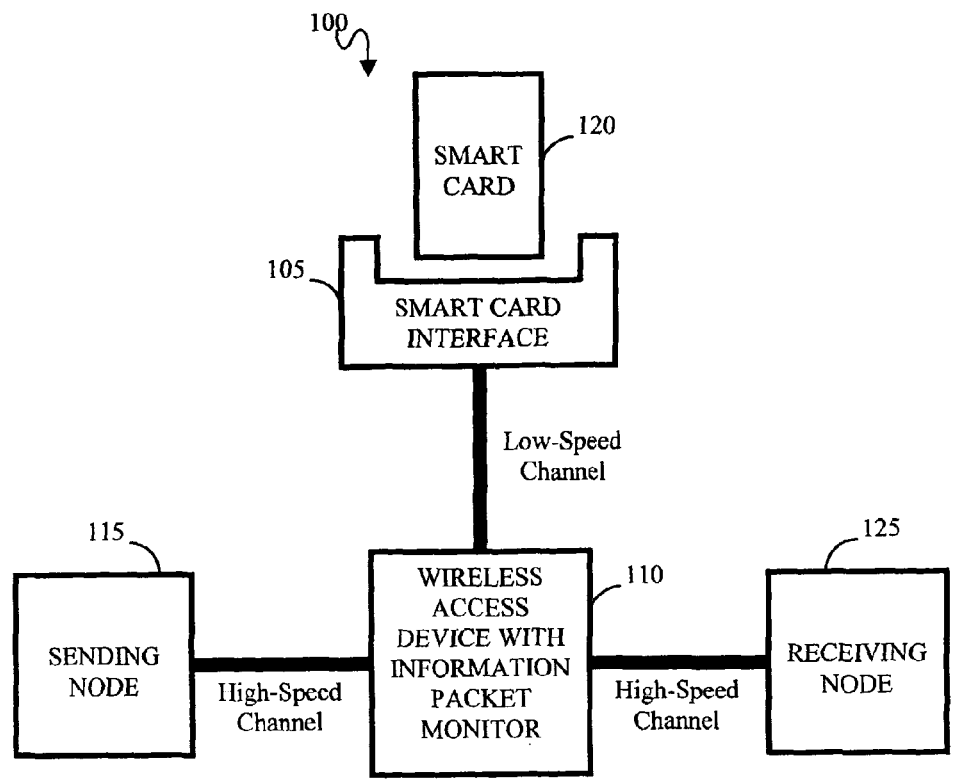
FIG. 1 is a block diagram depicting the structure of a communications network according to the invention.
Figure 2:
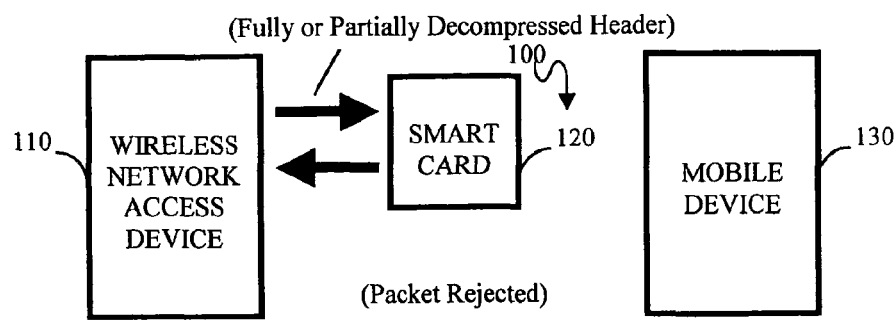
FIG. 2 is another block diagram of the network of FIG. 1, showing the network in a first state.
Figure 3:
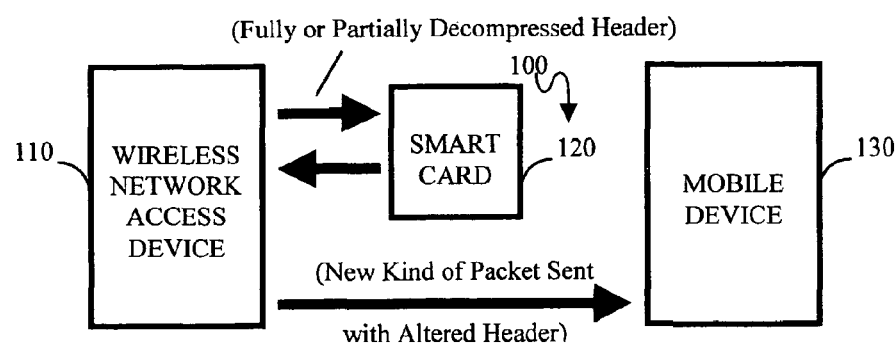
FIG. 3 is a further block diagram of the network of FIG. 1, showing the network in a second state, in which information packets are passed in accordance with modifications (e.g., updated rules) provided by the smart card.

Structure of a Network According to an Embodiment: Conceptual block diagrams of a communications network 100 according to the invention are shown in FIGS. 1 to 3. The major components of the network 100 are a wireless network access device 110 which is linked to a host computer, central office, central database, or the like, a smart card 120 storing intervention rule and access control information, and one or more mobile devices 130 capable of at least receiving information packets. The smart card 120 can be coupled to the communication network via smart card interface 105, as described in the "Background" Section herein and shown in FIG. 1. It will be appreciated by those skilled in the art that the mobile device can be any of a variety of devices capable of telephonic communication, including, inter alia, computers with modems, e-mail devices, personal communication devices, and others. Those skilled in the art will also appreciate that the components can be linked by any of a number of wireless telephony techniques, the selection of which is left to the implementer.

While the stored contingency rules for activating the smart card have heretofore focused on a threshold of changes in the headers being reached, other conditions may cause the smart card to be activated to alter the rules regulating the transfer of information packets. One such condition—but by no means the only one—is that information may not be accessed from certain locations. Alternatively, information may only be accessed from designated locations. For example, the smart card 120 may prohibit the receipt of information from locations such as coffee shops or libraries, where the potential for abuse may be higher. Forbidden reception locations (or the lack of a sanctioned location) can be identified by calling line identifiers (CLIs) provided by the telephone system central office, and their mobile telephone system equivalents. More complicated systems can even use the user's physical location, as determined by the Global Positioning Systems (GPS), to determine whether access is permitted.

Figure 4:
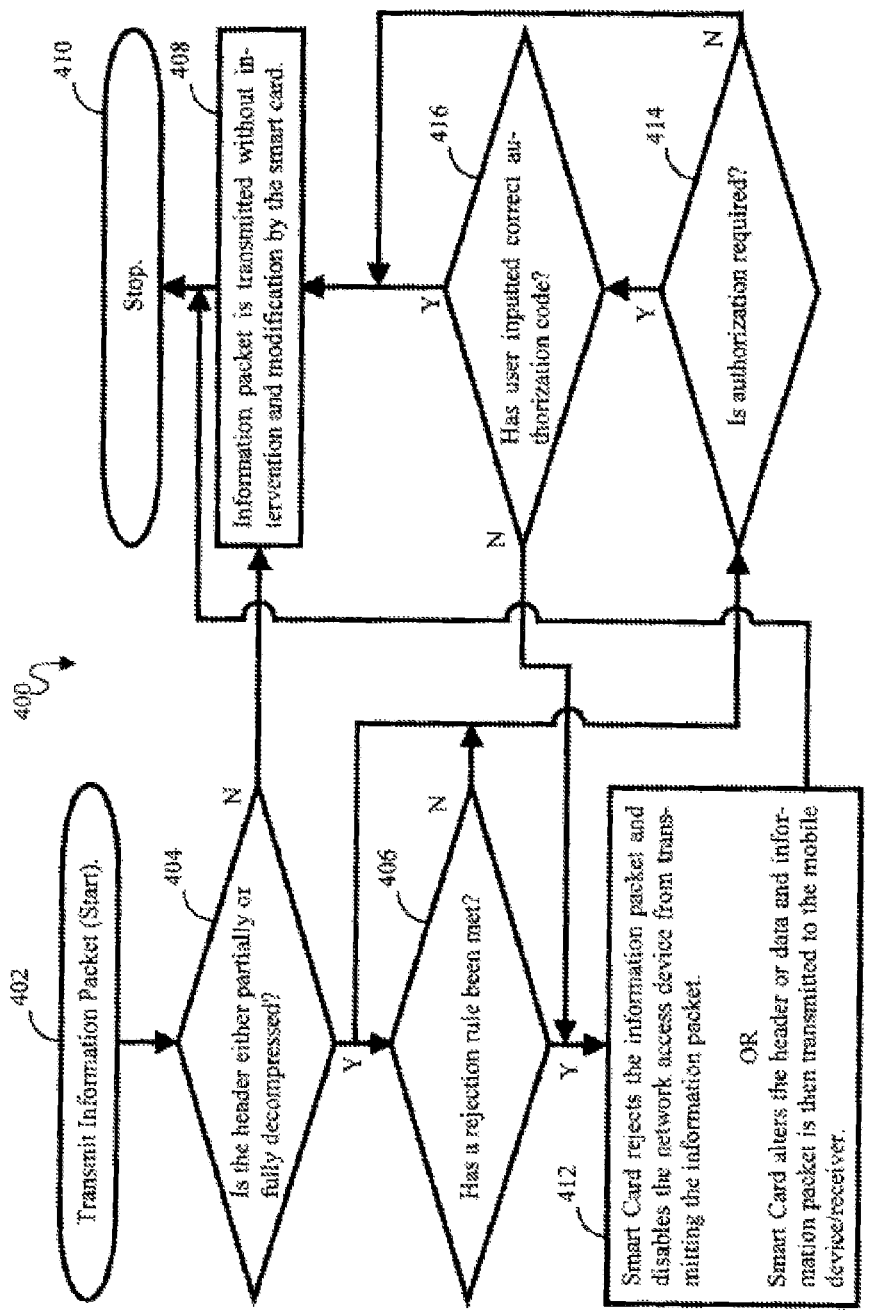
FIG. 4 is a flow chart representing method steps that can be executed by the communications network of FIGS. 1 to 3.

FIG. 1 shows the relationship of the information packet monitor 110, the smart card interface 105 and the smart card 120 to the communication connection between a sending node 115 and a receiving node 125. The information packet monitor 110 applies rules provided by the smart card to the information packets flowing between the sending and receive nodes (115, 125). Certain of these rules—such as rules regarding the passage of uncompressed protocol headers—cause the information packet monitor to provide information to the smart card, which, in turn, may modify the set of rules being used by the information packet monitor. In FIGS. 2, 3, and 4, the combination of the information packet monitor, the smart card interface and the smart card is represented as simply smart card 120.

Thus, in FIG. 2, the smart card 120 is involved in the flow of data between the wireless network access device 110 and the mobile device 130 only when the header information changes more than a predetermined threshold. If there is no change or if the change is below this threshold, the data flows directly from the wireless network access device to the mobile device.

When the change is above the threshold, as in FIG. 3 and the flowchart of FIG. 4, the wireless network access device 110 provides the smart card 120 with the new header information. The smart card 120 uses the information in the new header to determine whether or not the data in the associated packet (and all immediately subsequent packets with headers below a new threshold set by the card) should be passed to the mobile device 130. If the data may be passed to the mobile device 130, as in FIG. 3, then the smart card 120 simply signals this to the wireless network access device 110, which passes the data packet with the new header as possibly modified by the smart card 120 to the mobile device.

If the information packet may not be passed to the mobile device, such as in FIG. 3, then the smart card may simply signal this to the wireless network access device 110. In this case the data packet is discarded by the wireless network access device 110.

In one practice of the invention, the smart card can be made an indispensable part of the flow of information from the network entity to the mobile device. That is, if the smart card is removed or disabled, the transmitted information will not reach the mobile device 130 in a useable form. This is because the network entity will send out protocol packets with headers that rely on being changed (or decrypted) in a particular manner by the local smart card. If these changes are not made, then the packets will not be interpreted in a manner that yields coherent information by the mobile device 130. If the smart card provides for decrypting the data packets, then the protocol software in the mobile device 130 will correctly handle the packets. As noted above, these properties also apply to packets flowing from the mobile device to the network.

In one practice of the invention, the communications network can be used with various Internet protocols, including the IP, UDP and TCP.

The invention thus takes into account the modest computational power of the smart card, as well as the low data rate of the data channel to and from the smart card, compared to the high data rate between the wireless network access device 110 and the mobile device 130, while enabling the smart card to control the higher speed channel without performance degradation.

Those skilled in the art will appreciate that the present invention can be used with either low or high data rate channels between the sending and the receiving nodes. In the low data rate case, communication with the smart card may occur more frequently per transmitted byte than in the high data rate case. Compatible low data rate mobile telephony systems include GSM, GPRS, CDMA, TDMA, and 3G mobile data systems.

Method Steps in Accordance With an Embodiment: FIG. 4 illustrates a method 400 used by a network 100 in accordance with the invention.

The illustrated method begins when the network access device (or the mobile device) transmits an information packet. Non-restricted information is normally transmitted with a fully compressed header. If the header is either partially or fully decompressed, the smart card 120 determines whether a stored contingency rule has been met requiring action on the part of the smart card (Step 404). If the header is fully compressed, the information packet is passed to the mobile device undisturbed (Step 408), followed by the end step (410) of the algorithm. In the preferred embodiment, the algorithm 400 is repeated for each new information packet transmitted.

Returning to Step 406 for the case of a partially or fully decompressed header, the smart card determines whether a rejection rule (such as improper access site) has been met. If a rejection rule has been met, the smart card either rejects the information packet and disables the network access device from transmitting the information packet, or it alters the header or data (such as by decrypting a previously encrypted information packet), and the information packet is then transmitted to the mobile device in a usable form (Step 412).

The system also determines whether an authorization code is needed, and whether the proper one has in fact been entered by the user (Steps 414 and 416). If the correct access code has been entered, the information packet is transferred (Step 408). If not, the information packet is rejected (Step 412).

Those skilled in the art will appreciate that a wide range of variations and modifications of the present invention are possible, given the above description. For example, the present invention can be implemented not only in wireless networks, but in any type of communications network, regardless of the nature of the communication links.

Accordingly, the particular structures and methods described above are provided solely by way of example, and variations and modifications are considered to be within the scope of the protection granted by this Letters Patent, as defined by the following claims.

What is claimed is:

1. A method comprising:
    storing a contingency rule in a smart card; and
    regulating, using the smart card, an information packet in a communication network, wherein the regulating is based on a predefined change in the information packet from a previous information packet, the predefined change satisfying the contingency rule.

2. The method of claim 1, wherein the contingency rule comprises a predefined threshold of changes in a header of the information packet.

3. The method of claim 1, wherein regulating the information packet comprises disabling an information packet transmitter.

4. The method of claim 1, wherein regulating the information packet comprises disabling an information packet receiver.

5. The method of claim 1, wherein the information packet comprises a data block, and wherein regulating the information packet comprises:
    intercepting the information packet;
    modifying the data block; and
    re-transmitting the information packet with the modified data block.

6. The method of claim 5, wherein modifying the data block comprises decrypting the data block.

7. The method of claim 1, wherein the information packet comprises a header block, and wherein regulating the information packet comprises:
    intercepting the information packet;
    modifying the header block; and
    re-transmitting the information packet with the modified header block.

8. The method of claim 7, wherein modifying the header block comprises decrypting the header block.

9. The method of claim 1, further comprising:
    determining that an authorization code is required;
    receiving the authorization code in response to a determination that the authorization code is required; and
    transferring the information packet in response to a determination that the authorization code is the correct authorization code.

10. The method of claim 9, further comprising transferring the information packet in response to a determination that the authorization code is not required.

11. The method of claim 9, further comprising rejecting the information packet in response to a determination that the authorization code is not the correct authorization code.

12. The method of claim 11, wherein rejecting the information packet comprises disabling an information packet transmitter.

13. The method of claim 11, wherein rejecting the information packet comprises modifying the information packet.

14. A method comprising:
    receiving packet header information at a monitor;
    determining, at the monitor, whether the packet header information indicates that a packet header is compressed;
    determining, at the monitor, that a rejection rule associated with a smart card has been satisfied in response to a determination that the packet header is not compressed; and
    taking an action, by the monitor, regarding a packet associated with the packet header information in response to a determination that the rejection rule has been satisfied.

15. The method of claim 14, wherein the rejection rule comprises a reference to an improper access site.

16. The method of claim 14, wherein taking an action comprises preventing a network access device from transmitting the packet.

17. The method of claim 14, wherein taking an action packet comprises:
    altering the packet such that the altered packet is in a usable form; and
    transmitting the altered packet.

18. The method of claim 17, wherein altering the packet comprises altering a header of the packet.

19. The method of claim 17, wherein altering the packet comprises altering data of the packet.

20. The method of claim 17, wherein altering the packet comprises decrypting the packet.

* * * * *